United States Patent [19]
Schmucker

[11] 3,981,348
[45] Sept. 21, 1976

[54] SUPPORT AND LUBRICATION SYSTEM FOR CONTINUOUS CASTING MACHINE ROLLERS

[75] Inventor: William A. Schmucker, Cedarburg, Wis.

[73] Assignee: Allis-Chalmers Corporation, Milwaukee, Wis.

[22] Filed: Oct. 20, 1975

[21] Appl. No.: 623,599

[52] U.S. Cl. ............................. 164/149; 164/282; 184/7 R; 184/7 E; 193/35 R
[51] Int. Cl.² ................... B22D 11/14; F01M 1/06; F16N 25/02
[58] Field of Search ............. 164/282, 149; 184/7 R, 184/7 D, 7 E; 193/35 R

[56] References Cited
UNITED STATES PATENTS

| | | | |
|---|---|---|---|
| 1,805,303 | 5/1931 | Barks | 184/7 R |
| 3,406,789 | 10/1968 | Gruber | 184/7 E |
| 3,710,847 | 1/1973 | Schoffmann | 164/282 |

Primary Examiner—Robert D. Baldwin
Attorney, Agent, or Firm—Arthur M. Streich

[57] ABSTRACT

A roller assembly for such as supporting a strand of metal cast in a continuous casting machine is disclosed as having a shaft adapted to be journaled in supporting arms at axially spaced locations along the shaft. A plurality of axially spaced bearings are mounted on the outer periphery of the shaft. A plurality of axially spaced cylindrical shells are provided with each mounted on the outer periphery of a pair of bearings. At least one axial end of the shaft is bored to define at least four axially inwardly projecting lubricating passages to the bearings. A lubricant measuring and distributing valve assembly is mounted on the bored end of the shaft. The valve assembly has a body defining two lubricant inlets and four outlets aligned with the four shaft passages. Each of the inlets alternate in delivering lubricant to a pair of flow regulating valves. A pair of volume measuring valves are provided within the body and with each connected to one regulating valve and each of the flow regulating valves operate to transmit lubricant from either of the two inlets to its connected volume measuring valve. Alternating delivery of pressurized lubricant to the two inlets results in the delivery of measured volumes of lubricant through four outlets to aligned passages in the assembly shaft. The valve body may also be connected to the shaft and supporting structure to retain the shaft in proper alignment.

5 Claims, 9 Drawing Figures

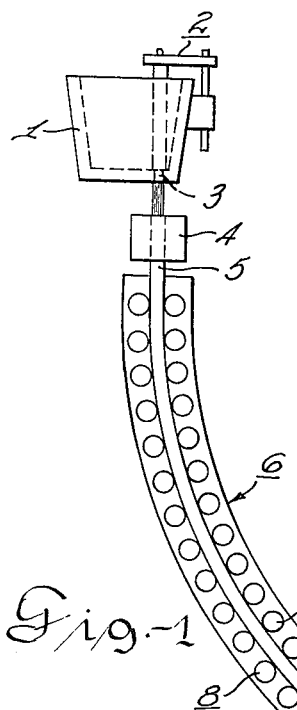
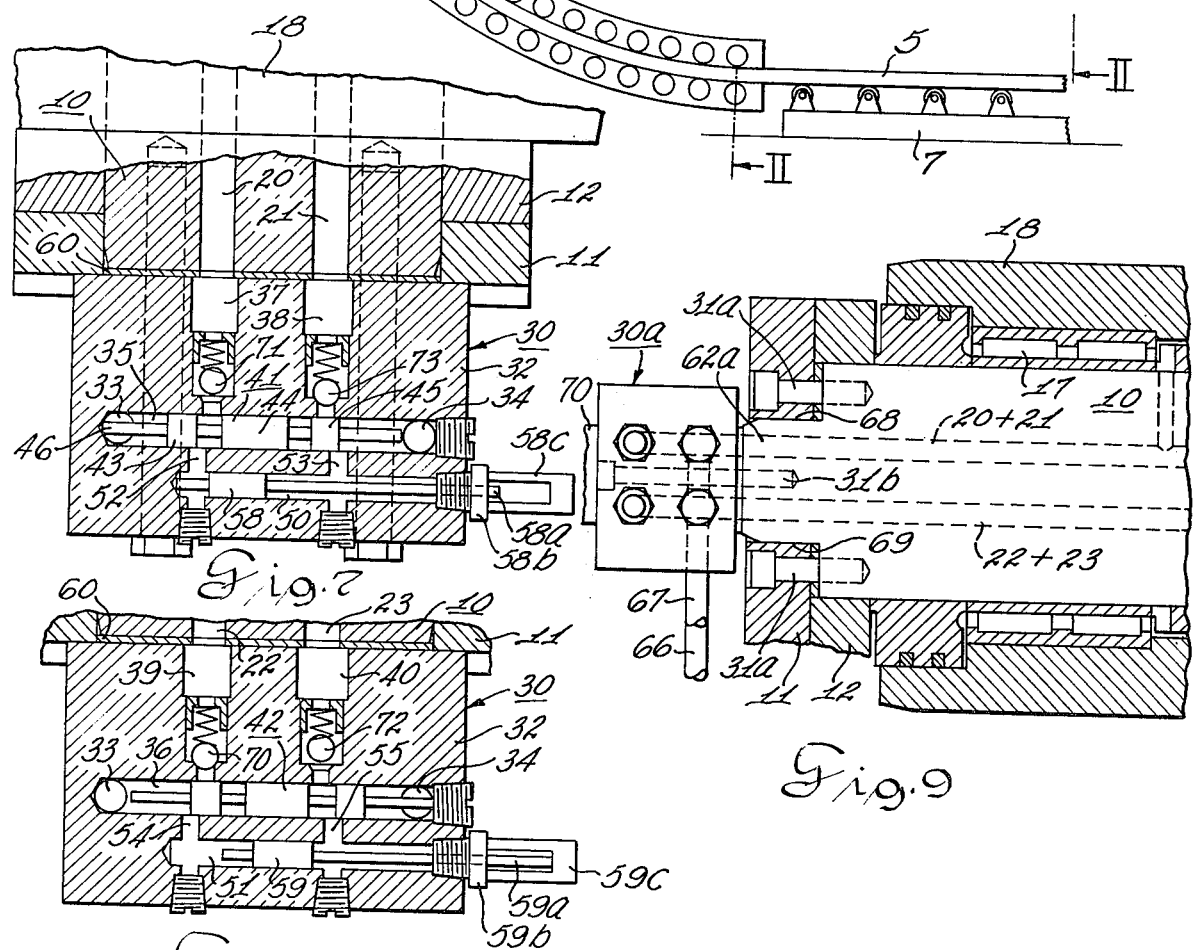

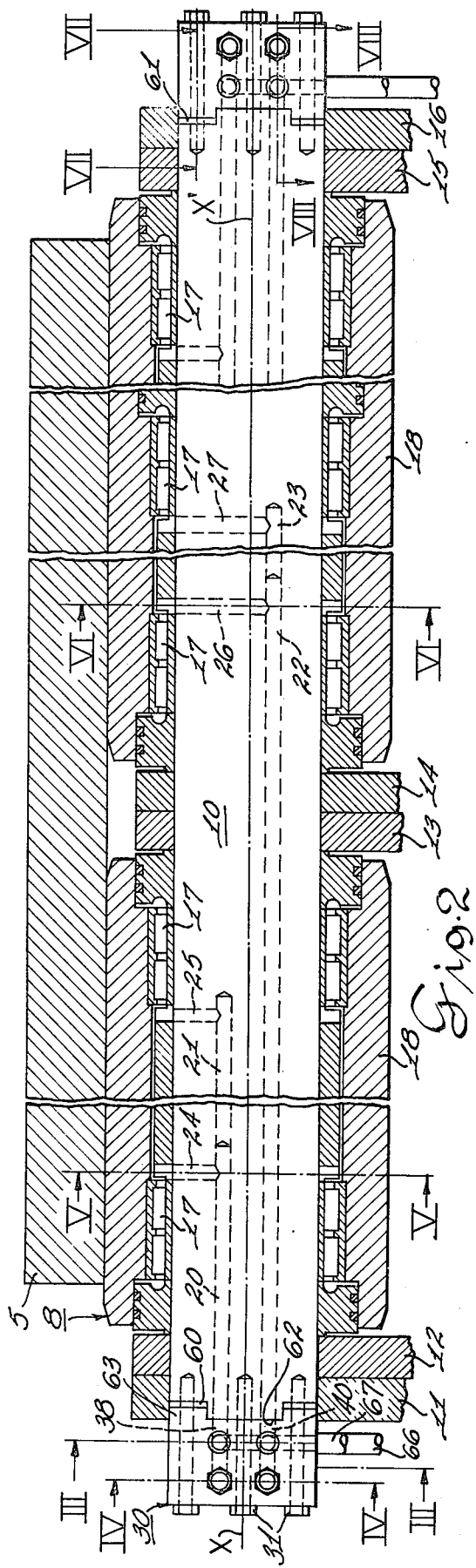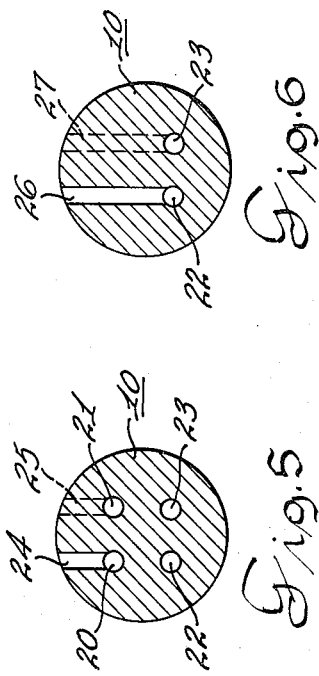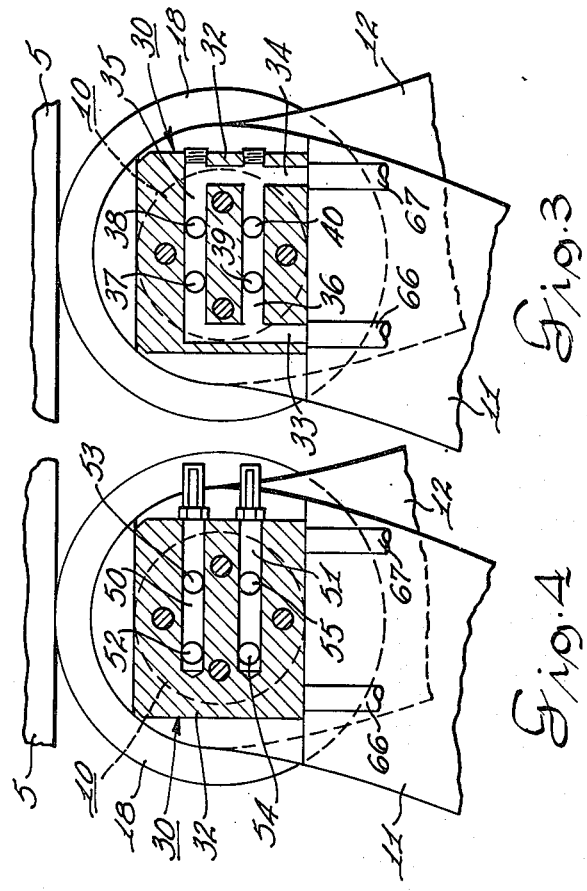

SUPPORT AND LUBRICATION SYSTEM FOR CONTINUOUS CASTING MACHINE ROLLERS

BACKGROUND OF THE INVENTION

1. Field of the Invention

This invention relates to continuous casting machines in which liquid metal is charged to a water cooled mold and therein is cooled sufficiently to form a generally vertical strand having a closed shell solidified metal surrounding a still liquid core. The strand thus formed emerges from the lower and open end of the mold to pass downwardly through a strand support system and secondary cooling zone. The strand support system in the secondary cooling zone comprises a plurality of rollers arranged to carry and guide the strand through a curved path to a horizontal run-out table. In particular, this invention relates to a construction of strand support rollers for use such as in the secondary cooling zone of such a casting machine, and which incorporate a new and improved arrangement for lubricating bearings that support such rollers.

2. Description of the Prior Art

A continuous casting machine of a type to which the present invention may be applied, is well known to the prior art and schematically illustrated in such as U.S. Pat. Nos. to Rudolf SChoffmann, 3,589,429, of June 29, 1971 and 3,747,664 of July 24, 1973. As illustrated in both of those patents, liquid metal may be poured into a cooled bottomless mold from which a strand of metal with a still liquid core emerges and is carried through a curved bow section for further cooling, and then to horizontal run-out table. Another patent to Rudolf Schoffmann, U.S. Pat. No. 3,710,847 of Jan. 16, 1973, discloses how rollers may be arranged and supported to carry and guide the cast strand through the curved bow section of such a machine.

The aforementioned patent, U.S. Pat. No. 3,710,847, also discloses (in FIG. 2 thereof) that for supporting a cast strand 1000 to 2000 mm wide with the minimum deflection desired, it is required to mount the strand supporting rollers with support intermediate its ends.

According to the teachings of the prior art, such multi-support roller assemblies have been provided with a fixed shaft, intermediate supports for the nonrotating shaft, bearings on the shaft and cylindrical shell rollers mounted over the bearings to turn freely relative to the nonrotating shaft. The requirement of freely turning rollers under pressure dictates the use of bearings. Sleeve type bearings, or bushings of different materials and antifriction bearings have been used. Regardless of the bearing type, it is imperative that the bearing be protected from contamination, by dirt, scale and water and that lubrication be supplied to the bearings to reduce friction. Some form of mechanical seals such as synthetic lip type, labyrinth or piston rings are used. In conjunction with mechanical seals, which are subject to wear, distortion or destruction from the severe environment of the process, it has been found that grease acts as an excellent bearing seal, lubricant and flushing agent for the slowly turning rollers. Good bearing performance is assured only if the bearing can be kept full of grease during operation and further that the grease be flushed through the bearing at periodic intervals.

Central grease systems are available which consist of reservoirs, pumping units, headers, metering valves and distribution lines which will deliver predetermined quantities of grease to each bearing at periodic intervals. One such system, with several modifications, is disclosed in U.S. Pat. No. 1,805,303, granted May 12, 1931. Another system in which grease is applied to a plurality of locations at a rate responsive to the rate of operation of the machine being greased is disclosed in U.S. Pat. No. 2,885,029 granted May 5, 1959. A more recent patent disclosing a device for delivering a measured quantity of grease to a plurality of locations at predetermined time intervals in U.S. Pat. No. 3,329,319 of 1967. When such systems are applied to the bow rollers for supporting a cast strand in a continuous casting machine, the metering valves which distribute measured quantities of grease from the headers to the bearings are usually mounted on or near the support structure for the equipment. Tubing and fittings connect the supply headers to the metering valve inlets and then additional tubing or flexible hoses connect the metering valve outlets to roll shaft retainer plates. The roll shafts and roll shaft retainer plates have drilled grease passages which conduct the grease to each bearing. The large number of bearings in a continuous casting machine requires the extensive use of metering valves, tubing, flexible hose and fittings. The lubrication system, with all its appurtenances, can obstruct access to the machine, complicate maintenance, delay replacement of equipment and increase facility downtime.

SUMMARY OF THE PRESENT INVENTION

It is a primary object of the present invention to greatly simplify and improve a machine such as a continuous casting machine which includes a relatively large number of roller assemblies by providing an improved roller assembly and an improved arrangement for supporting the roller assembly in a machine such as a continuous casting machine.

A more specific object of the present invention is to provide a new and improved roller assembly for which a pair of external lubricant delivery conduits serve to deliver measured quantities of lubricant at a predetermined pressure to more than two roller lubricant delivery passages defined within a roller shaft. Thus, the number of external lubricant delivery conduits and the total length of such conduits that need be provided for such as a continuous casting plant is vastly reduced.

A still more specific object of the present invention is to provide such as a continuous casting machine with an arrangement for lubricating and supporting roller assemblies in which certain parts perform more than one function. Thus, the total number of parts required for such a machine is significantly reduced.

According to a preferred embodiment of the present invention, a roller assembly is provided with a shaft adapted to be journaled in supporting arms at axially spaced locations along the shaft. A plurality of axially spaced bearings are mounted on the outer periphery of the shaft. A plurality of axially spaced cylindrical shells are provided with each mounted on the outer periphery of a pair of bearings. At least one axial end of the shaft is bored to define at least four axially inwardly projecting lubricating passages to the bearings. A lubricant measuring and distributing valve assembly is mounted on the bored end of the shaft. The valve assembly has a body defining two lubricant inlets and four outlets aligned with the four shaft passages. Each of the inlets alternate in delivering lubricant to a pair of flow regulating valves. A pair of volume measuring valves are provided within the body and with each connected to one regulating valve and each of the flow regulating valves operate to transmit lubricant from either of the two inlets to its connected volume measuring valve. Each volume measuring valve operates to receive a first predetermined volume of lubricant from the regulating valve connected thereto and thereafter each measuring valve receives a second such volume of lubricant which actuates the measuring valves to expel each of the first volumes of lubricant to its respective outlet which is aligned with one of the shaft passages. Each measuring valve then receives a third volume of lubricant from its regulating valve to replace its expelled first volume and actuate the measuring valves to expel each second volume of lubricant to other outlets aligned with other of the shaft passages. Alternating delivery of pressurized lubricant to the two inlets using any well known system, such as for example is disclosed in U.S. Pat. No. 1,805,303, results in the delivery of measured volumes of lubricant through four outlets to aligned passages in the assembly shaft.

Thus, for such an assembly, each conduit delivering lubricant thereto supplies two axially spaced bearing locations, which may also be viewed as cutting the required number of such conduits by one-half. When such a roll assembly is applied to such as a continuous casting machine, which requires a very large number of roller assemblies to support and turn a newly cast strand of metal from a vertical mold to a horizontal run-out table, a very large number of conduits of substantial length are eliminated, the machine is greatly simplified and access to the machine is much improved.

With further regard to utilizing the roller assembly of this invention in a continuous casting machine, the locating of a lubricant measuring and distributing valve on the end of the shaft to which lubricant is to be delivered permits connecting the valve body to the shaft and supporting structure to retain the shaft in proper alignment and, thus, also eliminates the need to provide special shaft retaining devices that have been used in the past.

Other features and objects of the invention that have been attained will appear from the more detailed description to follow with reference to an embodiment of the present invention shown in the accompanying drawing.

BRIEF DESCRIPTION OF THE DRAWING

FIG. 1 of the accompanying drawing shows diagrammatically a side elevation, partly in section, a continuous casting maching according to the present invention;

FIG. 2 is a view taken along line II—II in FIG. 1 and viewing a roller assembly, according to the present invention, in the direction indicated by arrows;

FIG. 3 is a view taken along line III—III in FIG. 2 and viewing the structure (with certain internal valve pistons removed) in the direction indicated by arrows;

FIG. 4 is a view taken along line IV—IV in FIG. 2 and viewing the structure (with certain internal valve pistons removed) in the direction indicated by arrows;

FIGS. 5 and 6 are cross-sectional views of the central shaft of the assembly shown in FIG. 2, taken along lines V—V and VI—VI, respectively, in FIG. 2, and viewing the central shaft in the direction indicated by the arrows in FIG. 2;

FIG. 7 is a view taken along line VII—VII in FIG. 2 and viewing the structures in the direction indicated by arrows;

FIG. 8 is a view taken along line VIII—VIII in FIG. 2 viewing the structure in the direction indicated by arrows, and with certain internal valve pistons in operating positions subsequent to the position of similar valves in FIG. 7; and FIG. 9 is a fragmentary view partly in section similar to FIG. 2 but showing another embodiment of the present invention.

DESCRIPTION OF THE PREFERRED EMBODIMENTS

Referring to FIG. 1, a continuous casting machine is shown as including a tundish 1 with a mechanism 2 for opening a bottom discharge post 3 for discharging liquid metal to a vertically oriented bottomless water cooled mold 4. Emerging from the bottom of mold 4 is a cast strand 5 having a solidified shell and liquid core not here shown but shown and described in detail in the aforesaid Schoffmann patent, U.S. Pat. No. 3,747,664.

The strand 5 issued from mold 4 is further cooled in a supporting and guiding section of the machine indicated generally by the number 6 which directs strand 5 to a horizontal run-out table 7. The supporting and guiding section 6 may be constructed as disclosed in detail in the aforesaid Schoffmann patent, U.S. Pat. No. 3,710,847. This supporting and guiding section 6 is provided with a plurality of roller assemblies 8 arranged on both sides of the strand 5, which will hereafter be described according to the present invention.

Referring to FIG. 2, a roller assembly 8 is shown as comprising a shaft 10 adapted to be journaled in supporting arms 11 through 16 which are arranged at locations spaced along a central axis X–X' through shaft 10. A plurality of axially spaced annular bearings 17 are mounted on the outer periphery of shaft 10. A plurality of axially spaced cylindrical roller shells 18 are mounted on the outer periphery of the annular bearings 17, preferably with a pair of the bearings 17 carrying each roller shell 18. The shaft 10 may be bored axially to provide a plurality of lubrication passages inwardly from each end. Since the design and construction of both ends of shaft 10 may be the same, a description of one end shall suffice and, with reference to FIG. 2, it shall be the end to the lift that shall be described. With reference thereto, four axially extending lubrication passages 20 through 23 are bored inwardly varying distances that permit one of four radial bores 24 through 27 to communicate with each of the axial bores 20 through 23, and open to locations on the periphery of shaft 10 that delivers lubricant therefrom to each of the annular bearings 17. A lubricant measuring and distributing valve assembly 30 is attached to the end of shaft 10 by such as bolts 31.

The valve assembly will be described with reference to FIG. 2, FIG. 3, FIG. 4, FIG. 7 and FIG. 8. The valve assembly 30 includes a body position 32 which, as best shown in FIG. 3, defines two lubricant passages 33, 34 connected to. a first pair of transverse horizontal passages 35, 36. As shown in FIG. 3 and FIG. 7, horizontal transverse passage 35 is connected to a pair of axially extending and horizontal lubricant outlets 37, 38 which are aligned with the shaft passages 20 and 21. As shown in FIG. 3 and FIG. 8, horizontal transverse passage 36 is connected to a pair of axially extending and horizontal lubricant outlets 39, 40 which are aligned with the shaft passages 22, 23.

Means are provided within the valve body 32 for regulating the admission of lubricant, which are shown in FIG. 7 and FIG. 8 as comprising a pair of flow regulating pilot piston valves 41, 42 and each having three axially aligned pistons 43, 44, 45 axially spaced along a stem 46. Both of the valves 41, 42 are movable, valve 41 within passage 35 and valve 42 within passage 36. Both valves 41, 42 alternate between the position shown in FIG. 7, which is a position taken by both valves 41 and 42 when pressurized lubricant is admitted through inlet passage 34; and the position shown in FIG. 8, which is a position taken by both valves 41 and 42 when pressurized lubricant is admitted through inlet passage 33.

Means are provided within the valve body 32 for measuring four predetermined volumes of lubricant for delivery by the assembly 30 to shaft passages 20–23. Such measuring means comprise passages and operating means which will now be described.

Referring to FIG. 4, FIG. 7 and FIG. 8, the valve body 32 defines a second pair of horizontal transverse passages 50, 51. As shown in FIG. 4 and FIG. 7, the horizontal passage 50 is connected to the passage 35 by connecting passages 52, 53. As shown in FIG. 4 and FIG. 8, the horizontal passage 51 is connected to the passage 36 by connecting passages 54, 55.

The operating means are shown in FIg. 7 and FIG. 8 and comprise a pair of volume measuring main piston valves 58, 59. Both of the valves 58, 59 are movable, valve 58 within passage 50 and valve 59 within passage 51. Both valves 58, 59 alternate between the position shown in FIG. 7, which is a position taken by both valves 58 and 59 when pressurized lubricant is admitted through passages 34, 35, 53 to passage 50 and 34, 35, 55 to passage 51; and the position shown in FIG. 8, which is a position taken by both valves 58 and 59 when pressurized lubricant is admitted through passages 33, 36, 54 to passage 51 and 33, 35, 52 to passage 50. The valves 58 and 59 are mounted on stems 58a, 59a which are axially movable through sealing plugs 58b, 59b. The stems 58a and 59a give a visual indication of valve position and plug caps 58c, 59c limit the movement of such valves as shown in FIG. 8.

Referring to FIG. 2 and FIG. 7, it can be seen that the support arms 11, 12 may be bored to receive shaft 10 with a somewhat snug fit; however, as shown in FIG. 7, the valve body 32 extends horizontally and radially outward of the shaft 10 and engages the arm 11 in surface to surface contact. Thus, the valve body 32 cooperates with such as a similar valve body on the opposite end of shaft 10, as shown in FIG. 2, to retain the shaft 10 in a selected axial position relative to the supporting arms 11–16, with minor adjustments being provided for by shims 60, 61 (in FIG. 2). FIG. 2 also shows how end portions 62, 63 of the shaft 10 and adjacent end of a valve body 32 may cooperate to define a key and keyway therebetween to hold shaft 10 against rotation relative to the lubricant outlet passages 37–40 in the valve body 32.

FIG. 9 shows another embodiment of the present invention in which shaft 10 is provided with an end portion 62a shaped to define two axially extending chord surfaces 68, 69 journaled in a close-fit bore in arm 11 while the shaft itself is journaled in a larger but also close-fit bore in arm 12. In this embodiment, bolts 31a pass through valve body 30a and into shaft 10. A backup rail 70 abuts the valve body 30a to retain the valve body and shaft 10 in predetermined axial position relative to arms 11, 12, while the end portion 62a with its two chord surfaces 68, 69 hold shaft 10 against rotation relative to arms 11, 12. The valve body 30a is then secured to shaft 10 by such as the bolts 31b.

In both embodiments of the present invention, lubricant is to be delivered to the valve bodies 32 by two tubular conduits 66, 67 for a greater number of passages (e.g., four) in shaft 10, with the flow through conduits 66, 67 alternating according to any desired time sequence by means not shown but which are well known to this art and may be, for example, as shown in the previously mentioned U.S. Pat. No. 1,805,303.

In the operation of a continuous casting machine and one or more roller assemblies, according to the present invention, a ladle (not shown) fills tundish 1 with hot liquid metal and the tundish 1 is tapped by the mechanism 2 to discharge liquid metal through the port 3 to the mold 4. The liquid metal is cooled sufficiently in mold 4 to emerge from the bottom thereof as the strand 5 with a solidified shell but still liquid core. The strand is further cooled and carried through the supporting and guiding section 6, between roller assemblies 8, to the horizontal run-out table 7.

During this operation, the roller assemblies require lubrication. The lubricant, usually a grease that can be used at high temperature, is delivered through the tubular conduits 66, 67, alternately and according to a predetermined time sequence (as per U.S. Pat. No. 1,805,303). Beginning with reference to FIG. 3, when pressure is applied to force grease through conduit 66 it passes through inlet passage 33 and into the two horizontal passages 35, 36. Referring now to FIG. 8, this incoming pressure from 33 into 36 pushes the flow regulating pilot piston valve 42 (and the valve 41 in passage 35) to the right as shown in FIG. 8. This opens passage 54 (and passage 52) and permits lubricant to pass therethrough into passage 51 (nd 50) and move the volume measuring main piston valve 59 (and 58) to the right, as shown in FIG. 8, until the stem 59a (and 58a) hits the cap 59c (and 58c). This fills the left end of passages 50 and 51, as shown in FIG. 8, with a first pair of measured volumes of lubricant. Then, as lubricant pressure shifts to conduit 67 and inlet passage 34, the right-hand end of both horizontal passages 35 and 36 fill and push valves 41 and 42 to the left to the position shown in FIG. 7. As the valves 41, 42 move from the position shown in FIG. 8 to the position shown in FIG. 7, passages 53, 55 are opened to admit into the right-hand ends of passages 50, 51 a second pair of volumes of lubricant. The admission of these second volumes of lubricant pushes the valves 58, 59 to the left, i.e., from the position shown in FIG. 8 to the position shown in FIG. 7, and the first pair of volumes of lubricant are pushed respectively through passages 54, 52 between cylinders 43, 44 of valve 41 (and similar cylinders of valve 42), as shown in FIG. 7. The first pair of volumes of lubricant then pass respectively through check valves 70, 71, then through passages 39, 37 to shaft passages 20, 22 and 24, 26 to lubricate bearings 17.

Next, lubricant pressure shifts back to conduit 66 and the operation is repeated with the second pair of measured volumes of lubricant being pushed respectively through passages 53, 55, between portions of the valve 41, 42, through check valves 72, 73, then through passages 38, 40 to shaft passages 21, 23 and 25, 27 to lubricate bearings 17.

The valve assemblies 30 per se are not the present invention as such units are available through commercial channels. For example, a suitable valve assembly would be a "Farval Dualine" measuring valve as marketed by the Farval Division of Eaton Yale & Towne Inc. In the past, however, such measuring valves were arranged on panels remote from the bearings to be lubricated. In the case of continuous casting machines and the like, it meant that if a roller shaft was provided with lubrication channels inwardly from each end, four tubular conduits and their connections were required for each end of each shaft. It is, however, the nature of the present invention to incorporate such a commercially available valve assembly into the roller assembly and with each such valve assembly mounted directly on the end of such a shaft with the, for example, four outlets of the valve assembly in direct alignment and face-to-face contact with four passages in the adjacent shaft. Thus, the four tubular conduits from the valve assembly to each such shaft end are eliminated and the combined valve-shaft assembly end is served by only two conduits. As an example, a continuous casting machine has been designed according to this invention with 780 fewer such tubular conduits and the elimination of a total of 10,000 feet of such conduits. The saving is not only substantial, but access to the machine for maintenance and repairs is vastly improved. Further, it has been shown how the present invention can provide for the shaft mounted valve assemblies to retain the shaft in proper axial position. In the afore design, according to the present invention, this resulted in the elimination of 258 retainer plates.

From the foregoing, it has been shown how the objects of the present invention have been attained in a preferred manner. However, modification and equivalents of the disclosed concepts such as readily occur to those skilled in the art are intended to be included in the scope of this invention. Thus, the scope of the invention is intended to be limited only by the scope of the claims such as are or may hereafter be appended hereto.

The embodiments of the invention in which an exclusive property or privilege is claimed are defined as follows:

1. A roller assembly for such as supporting a strand of metal cast in a continuous casting machine, with the roller assembly having a shaft adapted to be journaled in supporting arms at axially spaced locations along the shaft, a plurality of axially spaced bearings mounted on the outer periphery of the shaft, a plurality of axially spaced cylindrical roller shells mounted on the outer periphery of the bearings, at least one axial end of the shaft bored to define at least three axially inwardly projecting lubricating passages each in fluid communication with at least one radially extending lubrication passage located to deliver lubricant to one of the bearings, and including an improvement comprising a lubricant measuring and distributing valve assembly mounted on the end of the shaft so bored, with the valve assembly comprising:
   a. a body defining a pair of lubricant inlet passages for alternately receiving a pressurized lubricant according to a predetermined time sequence, and at least three outlets for discharging lubricant from the valve body in the shaft passages;
   b. means provided within the body and connected to each of the inlet passages for regulating the admission of lubricant;
   c. means provided within the body and connected to the regulating means for measuring four predetermined volumes of admitted lubricant; and
   d. operating means within the lubricant volume measuring means, responsive to a flow of pressurized lubricant from one of the inlet passages through the regulating means to operate the measuring means to receive a first pair of predetermined volumes of lubricant from the regulating means, after which the operating means operates in response to the alternating of pressure from the pair of inlet passages to operate the measuring means to receive a second pair of such volumes of lubricant which then actuate the operating means to expel the first pair of volumes of lubricant from the measuring means through first and second of the outlets respectively which are connected with a first and second of the shaft passages, and the operating means thereafter receives lubricant from the regulating means to replace the expelled first pair of volumes and such admission of lubricant actuates the operating means to expel the second pair of volumes of lubricant through at least a third outlet which is connected with a third shaft passage.

2. A roller assembly for such as supporting a strand of metal cast in a continuous casting machine, with the roller assembly having a shaft adapted to be journaled in supporting arms at axially spaced locations along the shaft, a plurality of axially spaced bearings mounted on the outer periphery of the shaft, a plurality of axially spaced cylindrical roller shells mounted on the outer periphery of the bearings, at least one axial end of the shaft bored to define at least four axially inwardly projecting lubricating passages each in fluid communication with at least one radially extending lubrication passage located to deliver lubricant to one of the bearings, and including an improvement comprising a lubricant measuring and distributing valve assemlby mounted on the said one end of the shaft so bored, with the valve assembly comprising:
   a. a body defining a pair of lubricant inlet passages for alternately receiving a pressurized lubricant according to a predetermined time sequence, and four outlets for discharging lubricant from the valve body to the four shaft passages;
   b. a pair of flow regulating valves within the body and with each constructed and arranged to receive lubricant from either of the inlet passages;
   c. a pair of lubricant volume measuring valves within the body and with each connected to one flow regulating valve and with each of the flow regulating valves being connected to one measuring valve to transmit lubricant from either of the two inlet passages to the lubricant volume measuring valve connected thereto; and
   d. each lubricant volume measuring valve being constructed to operate to receive a first predetermined volume of lubricant from the regulating valve connected thereto and thereafter each measuring valve receives a second such volume of lubricant from the connected regulating valve, which actuates the measuring valves to expel each of the first volumes of lubricant to an outlet aligned with one of the shaft passages, and thereafter each measuring valve receives a third volume of lubricant from its regulating valve to replace its expelled first volume and actuate the measuring valves to expel each second volume of lubricant to other of the outlets aligned with another of the shaft passages.

3. A continuous casting machine comprising a vertically oriented water cooled mold and a plurality of roller assemblies according to claim 1 mounted below said mold for supporting and conveying a newly cast strand while the strand cools, in which the ends of the roller assembly shaft are journaled in supporting arms with the supporting arm for at least one end of the shaft being bored to receive the shaft end, and the lubricant measuring and distributing valve assembly is mounted on such a shaft end with at least a portion of the valve body projecting radially outward of the bore in the supporting arm, whereby the valve body acts to abut the supporting arm and prevent movement of the shaft in the arm bore axially away from the valve housing.

4. A continuous casting machine according to claim 3 in which facing surfaces of the end of the shaft and the valve body define a first key and keyway interlocked to prevent rotation therebetween; and a portion of the valve body remote from the shaft, defines a second key interlocked with a keyway defined in the adjacent supporting arm to prevent rotation therebetween.

5. A continuous casting machine comprising a vertically oriented water cooled mold and a plurality of roller assemblies according to claim 1 mounted below said mold in which at least the said one end of the shaft is provided with an end portion shaped to define two parallel axially extending chord surfaces journaled in a bore in the supporting arm, the valve body is bolted to the end portion, a rail, and means supporting the rail to engage the end surface of the valve body opposite the shaft, whereby the rail acts as a shaft retainer to maintain the shaft in a predetermined axial position relative to the bored supporting arm and the chord surfaces journaled in a supporting arm hold the shaft against rotation relative to the supporting arm.

* * * * *